(12) United States Patent
Li (10) Patent No.: US 10,375,366 B2
(45) Date of Patent: Aug. 6, 2019

(54) METHOD AND APPARATUS FOR CONTROLLING SCREEN OF TERMINAL DEVICE TO EMIT LIGHT

(71) Applicant: Beijing Xiaomi Mobile Software Co., Ltd., Haidian District, Beijing (CN)

(72) Inventor: Guosheng Li, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 0 days.

(21) Appl. No.: 15/838,365

(22) Filed: Dec. 12, 2017

(65) Prior Publication Data

US 2018/0176527 A1    Jun. 21, 2018

(30) Foreign Application Priority Data

Dec. 15, 2016 (CN) .......................... 2016 1 1158617

(51) Int. Cl.
*G09G 3/20* (2006.01)
*H04M 1/22* (2006.01)
(Continued)

(52) U.S. Cl.
CPC .............. *H04N 9/73* (2013.01); *G03B 15/03* (2013.01); *G09G 3/20* (2013.01); *H04M 1/22* (2013.01);
(Continued)

(58) Field of Classification Search
CPC ...... H04N 9/73; H04N 5/2351; H04N 5/2354; H04N 5/2256; G09G 3/20; H04M 1/22;
(Continued)

(56) References Cited

U.S. PATENT DOCUMENTS

2007/0081094 A1* 4/2007 Ciudad ................ H04N 5/2354
                                                                  348/371
2009/0033646 A1* 2/2009 Liu ...................... G09G 3/3406
                                                                  345/207
(Continued)

FOREIGN PATENT DOCUMENTS

CN          1980348 A       6/2007
CN        102955326 A       3/2013
(Continued)

OTHER PUBLICATIONS

Extended European Search Report for European Application 17207380.1, dated May 3, 2018.
(Continued)

*Primary Examiner* — Gevell V Selby
(74) *Attorney, Agent, or Firm* — Jun He Law Office P.C.; James J. Zhu (57) ABSTRACT

A method for controlling a screen of a terminal device to emit light includes: determining whether a screen flash lamp function is in an active state when the terminal device is in a photographing mode, wherein the screen flash lamp function enables the screen to serve as a flash lamp; and controlling the screen to emit light as a flash lamp according to a first color temperature correction scheme if the screen flash lamp function is in the active state, wherein the first color temperature correction scheme is configured to adjust a color temperature of the screen from an original color temperature to a target color temperature, and wherein the original color temperature is a color temperature when the screen emits light without color shift correction.

11 Claims, 4 Drawing Sheets

(51) Int. Cl.
*H04N 9/73* (2006.01)
*G03B 15/03* (2006.01)
*H04N 5/225* (2006.01)
*H04N 5/235* (2006.01)
*H04W 52/02* (2009.01)

(52) U.S. Cl.
CPC ......... *H04N 5/2256* (2013.01); *H04N 5/2351* (2013.01); *H04N 5/2354* (2013.01); *G03B 2215/0596* (2013.01); *H04M 2250/12* (2013.01); *H04W 52/027* (2013.01); *Y02D 70/142* (2018.01); *Y02D 70/144* (2018.01); *Y02D 70/166* (2018.01)

(58) Field of Classification Search
CPC ................ H04M 2250/12; G03B 15/03; G03B 2215/0596; H04W 52/027
See application file for complete search history.

(56) References Cited

U.S. PATENT DOCUMENTS

| | | | |
|---|---|---|---|
| 2013/0050233 A1 | 2/2013 | Hirsch | |
| 2014/0225980 A1* | 8/2014 | Patel | H04N 5/20 348/14.08 |
| 2015/0002735 A1 | 1/2015 | Moskovchenko | |
| 2016/0088228 A1 | 3/2016 | Tsai | |
| 2016/0225301 A1* | 8/2016 | Scepanovic | G09G 3/32 |

FOREIGN PATENT DOCUMENTS

| | | | |
|---|---|---|---|
| CN | 104754239 A | 7/2015 | |
| CN | 104766574 A | 7/2015 | |
| CN | 105426068 A | 3/2016 | |
| CN | 105554413 A | 5/2016 | |
| CN | 105744174 A | 7/2016 | |
| CN | 105791708 A | 7/2016 | |
| CN | 105959491 A | 9/2016 | |
| CN | 106097953 A | 11/2016 | |
| CN | 106604010 A | 4/2017 | |
| EP | 1775939 A2 | 4/2007 | |
| JP | 2013242504 A | 12/2013 | |
| JP | 2014183558 A | 9/2014 | |
| KR | 20140022237 A | 2/2014 | |

OTHER PUBLICATIONS

International Search Report of PCT Application No. PCT/CN2017/093695 dated Aug. 30, 2017.

\* cited by examiner

METHOD AND APPARATUS FOR CONTROLLING SCREEN OF TERMINAL DEVICE TO EMIT LIGHT

CROSS-REFERENCE TO RELATED APPLICATIONS

This application is based on and claims priority to Chinese Patent Application No. 201611158617.1, filed on Dec. 15, 2016, the entire contents of which are incorporated herein by reference.

TECHNICAL FIELD

The present disclosure relates to the field of display technologies, and more particularly, to a method and an apparatus for controlling a screen of a terminal device to emit light.

BACKGROUND

In the event that a terminal device is in a photographing mode, it is required to enable its flash lamp function when the environment is dark, so as to compensate insufficient brightness of environment light by emitting light from a flash lamp of the terminal device.

In related technologies, there is a scheme where a screen of the terminal device is used as the flash lamp. For example, when a front camera is employed to photograph, the screen may be controlled to emit light to serve as the flash lamp if it is required to enable the flash lamp function.

SUMMARY

Embodiments of the present disclosure provide a method and an apparatus for controlling a screen of a terminal device to emit light. The technical solutions are as below.

According to a first aspect of the embodiments of the present disclosure, there is provided a method for controlling a screen to emit light, and the method includes:

determining whether a screen flash lamp function is in an active state when the terminal device is in a photographing mode, wherein the screen flash lamp function enables the screen to serve as a flash lamp; and controlling the screen to emit light as a flash lamp according to a first color temperature correction scheme if the screen flash lamp function is in the active state, wherein the first color temperature correction scheme is configured to adjust a color temperature of the screen from an original color temperature to a target color temperature, and wherein the original color temperature is a color temperature when the screen emits light without color shift correction.

According to a second aspect of the embodiments of the present disclosure, there is provided an apparatus for controlling a screen of a terminal device to emit light, and the apparatus includes:

a state detecting module, configured to determine whether a screen flash lamp function is in an active state when the terminal device is in a photographing mode, wherein the screen flash lamp function enables the screen to serve as a flash lamp; and a first control module, configured to control the screen to emit light as a flash lamp according to a first color temperature correction scheme if the screen flash lamp function is in the active state, wherein the first color temperature correction scheme is configured to adjust a color temperature of the screen from an original color temperature to a target color temperature, and wherein the original color temperature is a color temperature when the screen emits light without color shift correction.

According to a third aspect of the embodiments of the present disclosure, there is provided an apparatus for controlling a screen of a terminal device to emit light, and the apparatus includes:

a processor, and a memory, configured to store executable instruction of the processor.

The processor is configured to:

determine whether a screen flash lamp function is in an active state when the terminal device is in a photographing mode, wherein the screen flash lamp function enables the screen to serve as a flash lamp; and control the screen to emit light as a flash lamp according to a first color temperature correction scheme if the screen flash lamp function is in the active state, wherein the first color temperature correction scheme is configured to adjust a color temperature of the screen from an original color temperature to a target color temperature, and wherein the original color temperature is a color temperature when the screen emits light without color shift correction.

According to a fourth aspect of the embodiments of the present disclosure, there is provided a non-transitory computer-readable storage medium having stored therein instructions that, when executed by a processor of a terminal device, causes the terminal device to perform a method for controlling a screen of the terminal device to emit light, the method comprising: determining whether a screen flash lamp function is in an active state when the terminal device is in a photographing mode, wherein the screen flash lamp function enables the screen to serve as a flash lamp; and controlling the screen to emit light as a flash lamp according to a first color temperature correction scheme if the screen flash lamp function is in the active state, wherein the first color temperature correction scheme is configured to adjust a color temperature of the screen from an original color temperature to a target color temperature, and wherein the original color temperature is a color temperature when the screen emits light without color shift correction.

The technical solutions provided by the embodiments of the present disclosure may include following beneficial effects.

By presetting a color temperature correction scheme in a terminal device, when the screen of the terminal device is required to serve as a flash lamp to emit light, the screen is controlled to emit light according to the color temperature correction scheme so that a color of an object finally photographed meets user expectation, thereby improving the photographing quality.

It is to be understood that both the foregoing general description and the following detailed description are exemplary and explanatory only and are not restrictive of the present disclosure.

BRIEF DESCRIPTION OF THE DRAWINGS

The accompanying drawings herein, which are incorporated in and constitute a part of this specification, illustrate examples consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following exemplary embodiments do not represent all implementations consistent with the present disclosure. Instead, they are merely examples of apparatuses and methods consistent with aspects related to the present disclosure as recited in the appended claims.

Limited by display characteristics of a screen, a color rendering property of the screen is poor because light emitted from the screen is not of a full-band spectrum. For example, certain color shift (for example, red shift) may exist when some screens emit white light, which results in relatively large deviation of the accuracy of the color of an object finally photographed when the screens are used as flash lamps, thereby having a negative effect on the photographing quality. Accordingly, the embodiments of the present disclosure provide a method for controlling a screen of a terminal device to emit light and an apparatus based on the method to solve the above technical problems. According to the technical solutions provided by the embodiments of the present disclosure, by presetting a color temperature correction scheme in a terminal device, when the screen of the terminal device is used as a flash lamp to emit light, the screen is controlled to emit light according to the color temperature correction scheme to adjust color shift when the screen emits light, so that the color of the object finally photographed meets user's expectation, thereby improving the photographing quality.

According to the method provided by the embodiments of the present disclosure, a subject for implementing the steps of the method may be a terminal device having a screen flash lamp function. The screen flash lamp function refers to a function enables the screen to serve as a flash lamp. The terminal device is provided with a camera and a screen. The camera and the screen are arranged at the same side of the terminal device. For example, the terminal device may be a mobile phone provided with a front camera, or the terminal device also may be an electronic device such as a tablet computer, a multimedia playback device, a personal digital assistant, and the like.

Figure 1A:
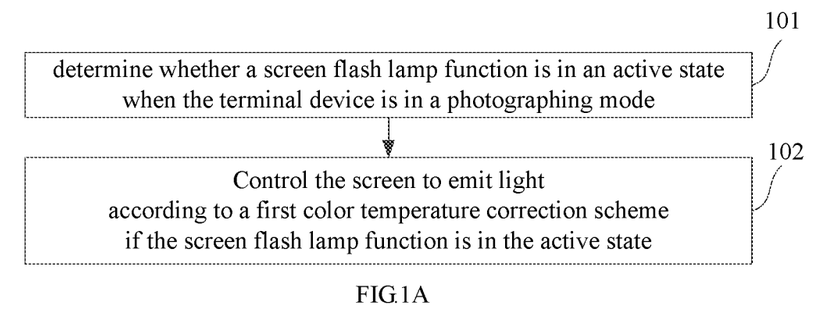
FIG. 1A is a flow chart showing a method for controlling a screen to emit light according to an exemplary embodiment.

FIG. 1A is a flow chart showing a method for controlling a screen of a terminal device to emit light according to an exemplary embodiment. The method may include following steps.

In Step 101, it is determined whether a screen flash lamp function is in an active state when the terminal device is in a photographing mode.

The photographing mode refers to that an application program (for example, a camera application) having a photographing function is running. The screen flash lamp function refers to a function enabling the screen to serve as a flash lamp. For example, when the terminal device uses the front camera to photograph, the screen may be used as the flash lamp to emit light.

In Step 102, the screen is controlled to emit light as a flash lamp according to a first color temperature correction scheme if the screen flash lamp function is in the active state.

The first color temperature correction scheme is preset in the terminal device. The first color temperature correction scheme is invoked when the terminal device is in the photographing mode and the screen flash lamp function is in the active state. The first color temperature correction scheme is set according to an original color temperature and a target color temperature of the screen to meet preset requirements for photographing color temperature. The first color temperature correction scheme adjusts the color temperature of the screen of the terminal device from the original color temperature to the target color temperature. For example, the first color temperature correction scheme is preset according to the original color temperature and the target color temperature of the screen, and the first color temperature correction scheme is stored in the terminal device. In the embodiments of the present disclosure, it is implemented to adjust the color shift when the screen emits light by adjusting the color temperature when the screen emits light.

The original color temperature of the screen refers to the color temperature when the screen emits light without color shift correction. The original color temperature of the screen determines an original color shift of the screen. The original color shift of the screen refers to the color shift when the screen emits light without color shift correction. The original color shift of the screen may be any one of red, green or blue. For example, the original color shift of the screen is red when the original color temperature of the screen is 3,500K. The target color temperature of the screen refers to the color temperature to which the screen is adjusted when the screen is required to serve as the flash lamp to emit light. The target color temperature of the screen determines a target color shift of the screen. The target color shift of the screen refers to the color shift to which the screen is adjusted when the screen is required to serve as the flash lamp to emit light. The target color temperature may be of a specific numerical value, or may be within a range. Alternatively, the target color temperature is 6,500K, or the target color temperature ranges from 6,500K to 6,500K so that light emitted by the screen is close to a natural light. When the screen serve as the flash lamp to emit light, the screen is controlled to emit natural light, so that the color of a photographed object is closer to the true color of the object under illumination of the natural light, thereby avoiding serious color shift, and improving the photographing quality.

Alternatively, the first color temperature correction scheme is used for adjusting a grayscale of at least one color channel of the screen. Adjustment of the color temperature when the screen emits light is implemented by means of grayscale correction. That is, color shift occurs when the screen emits light is adjusted. For example, the original color temperature of the screen is 3,500K, and the target color temperature is 6,500K. That is, the original color shift of the screen is red, and the target color shift is the natural light. The first color temperature correction scheme is used for adjusting the grayscale of a red (R) channel of the screen. For example, the grayscale of the R channel is reduced to enhance the color temperature of the screen so that light emitted by the screen is close to the natural light.

In a first implementation, the first color temperature correction scheme includes a grayscale for each color channel of the screen when the screen is required to serve as the flash lamp to emit light. For example, when the color channel in need of grayscale correction is the R channel, the first color temperature correction scheme includes a corrected grayscale for the R channel, and uncorrected grayscales for a green (G) channel and a blue (B) channel respectively.

In a second implementation, the first color temperature correction scheme includes a grayscale voltage for each color channel of the screen when the screen is required to serve as the flash lamp to emit light. For example, when the color channel in need of grayscale correction is the R channel, the first color temperature correction scheme includes a corrected grayscale voltage for the R channel, and uncorrected grayscale voltages for the G channel and the B channel respectively.

Figure 1B:
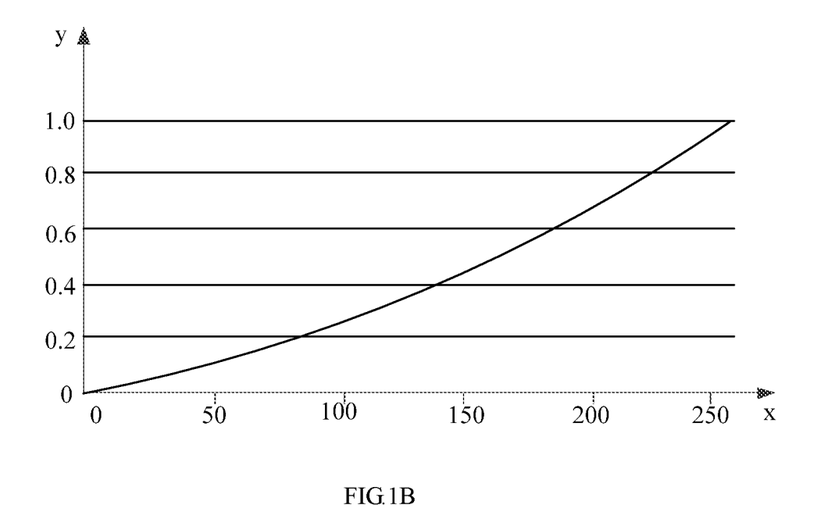
FIG. 1B is a schematic diagram showing a gamma curve according to an exemplary embodiment.

Alternatively, the first color temperature correction scheme may adopt a gamma correction scheme, and a gamma curve generally is expressed by a power function. As shown in FIG. 1B, a schematic diagram of a gamma curve is exemplarily illustrated. In a two-dimensional rectangular coordinate system as shown in FIG. 1B, an abscissa is x, an ordinate is y, and the power function corresponding to the gamma curve may be expressed as:

$y=x^{\gamma}$;

wherein y represents a corrected grayscale (expressed by a value subject to normalization processing), x represents an uncorrected grayscale, and γ (namely, the gamma) is a preset constant. A value of γ may be preset according to uncorrected and corrected grayscale values. Exemplarily, the value of γ is 2.0, and correspondingly a correction scheme is referred to as a gamma 2.0 correction scheme. In the embodiments of the present disclosure, an uncorrected grayscale of certain color channel is set according to the original color temperature of the screen, and a corrected grayscale of the color channel is set according to the target color temperature.

Optionally, Step 102 may include following two substeps:

Substep 1: the grayscale voltage for each color channel of the screen is determined according to the first color temperature correction scheme.

The color channels of the screen include the R channel, the G channel and the B channel. The grayscale for each color channel is driven and presented by the grayscale voltage.

Corresponding to the first implementation, when the first color temperature correction scheme includes respective grayscales for the color channels of the screen when the screen is required to serve as the flash lamp to emit light, the terminal device respectively determines the grayscale voltages for the color channels according to the respective grayscales for the color channels of the screen. A mapping relation exists between the grayscales and the grayscale voltages, and the preset relation may be expressed by a preset corresponding relation or a preset formula.

Corresponding to the second implementation, when the first color temperature correction scheme includes grayscale voltages for the color channels of the screen when the screen is required to serve as the flash lamp to emit light, the terminal device directly reads the grayscale voltages for the color channels of the screen.

Substep 2: the screen is controlled to emit light using the determined grayscale voltages when the screen is required to serve as the flash lamp to emit light.

When the screen is required to serve as the flash lamp to emit light, for example, when the terminal device receives a photographing instruction triggered by the user, the terminal device controls the screen to emit light using the determined grayscale voltages.

In the embodiments of the present disclosure, types of the screen are not limited. For example, the screen may be a liquid crystal display (LCD) screen or may be an organic light-emitting diode (OLED) screen. The above method may be adopted for color shift correction for different types of screens. Principles of emitting light by different types of screens generally are different. Therefore, control principles for color shift correction using the above method are also different.

The control principles for color shift correction using the above method are introduced in the following by taking two different types of screens (the LCD screen and the OLED screen) as examples. For the LCD screen, a transmittance corresponding to certain color channel can be changed by adjusting the grayscale voltage for the color channel, and further the grayscale for the color channel may be changed. For the OLED screen, a light emission effect of organic light-emitting small molecule materials for certain color channel can be changed by adjusting the grayscale voltage for the color channel, and further the grayscale for the color channel may be changed.

Alternatively, after Step 102, the following step is further included: the screen is controlled to emit light according to a second color temperature correction scheme after the screen flash lamp function is switched from the active state to an inactive state.

The second color temperature correction scheme is used for ensuring that an interface display effect of the screen meets a preset requirement, i.e. the terminal device is in a normal display mode rather than in the photographing mode. The normal display mode refers to a display mode when the screen flash lamp function is not enabled for the terminal device. For example, the screen is in a state for displaying the user interface. For example, the second color temperature correction scheme is used for ensuring that interface display effects such as grayscale, chroma or smoothness meet preset requirements when the screen is in the normal display mode. Compared with the first color temperature correction scheme, the second color temperature correction scheme has a correction objective different from that of the first color temperature correction scheme. The correction objective of the first color temperature correction scheme is to adjust the color shift when the screen emits light so that the color shift meets the expectation when the screen serves as the flash lamp to emit light. The correction objective of the second color temperature correction scheme is to adjust the interface display effect of the screen so that the interface display effect is better when the screen is in the normal display mode.

The second color temperature correction scheme also may adopt the gamma correction scheme. The common gamma correction scheme for the terminal device in the normal display mode is a gamma 2.2 correction scheme.

It is unnecessary for an electronic device to use the screen as the flash lamp to emit light after the screen flash lamp function is switched from the active state to the inactive state. To ensure the interface display effect when the electronic device is in the normal display mode, the electronic device controls the screen to emit light according to the second color temperature correction scheme.

In conclusion, according to the method provided by this embodiment, by presetting a color temperature correction scheme in a terminal device, when the screen of the terminal device is required to serve as a flash lamp to emit light, the screen is controlled to emit light according to the color temperature correction scheme so that a color of an object finally photographed meets user expectation, thereby improving the photographing quality.

In addition, when the preset color temperature correction scheme is a natural light color temperature correction scheme, which is used for adjusting the color temperature when the screen emits light so that the screen emits the natural light, the terminal device can control the screen to emit light close to the natural light according to the natural light color temperature correction scheme so that the color of a photographed object is closer to its true color, thereby avoiding serious color shift, and improving the photographing quality.

In the embodiment as shown in FIG. 1A, taking the preset first color temperature correction scheme in the terminal device being the natural light color temperature correction scheme as an example, correction of the color temperature when the screen emits light is implemented so that the screen emits the natural light. In other implementations, the first color temperature correction scheme also may be a warm light color temperature correction scheme or a cold light color temperature correction scheme. The warm light color temperature correction scheme is used for adjusting the color temperature of the screen so that the screen emits a warm light warmer than the natural light such as red light, yellow light, or orange light, etc. The cold light color temperature correction scheme is used for adjusting the color temperature of the screen so that the screen emits a cold light colder than the natural light such as blue light, or purple light, etc.

Figure 2:
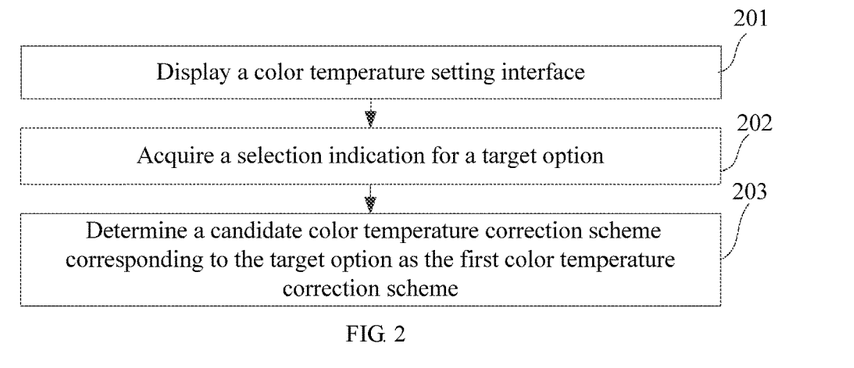
FIG. 2 is a flow chart showing a selection flow of a color temperature correction scheme according to an exemplary embodiment.

In one example, a plurality of candidate color temperature correction schemes are preset in the terminal device for user-defined selection. As shown in FIG. 2, a related selection flow may include following steps.

In Step 201, a color temperature setting interface is displayed.

The color temperature setting interface includes at least two options, and each of the options corresponds to a candidate color temperature correction scheme. Optionally, the candidate color temperature correction scheme includes at least two of: the natural light color temperature correction scheme, the warm light color temperature correction scheme, and the cold light color temperature correction scheme.

In this embodiment, a time for the terminal device to display the color temperature setting interface is not limited. For example, after it is determined that the screen flash lamp function is switched from the inactive state to the active state, the terminal device may automatically display the color temperature setting interface. For another example, the terminal device may display the color temperature setting interface after acquiring an operation instruction. The operation instruction is an instruction, triggered by the user, for instructing the terminal device to display the color temperature setting interface.

In Step 202, a selection indication for a target option is acquired.

The target option is any one of the above at least two options displayed in the color temperature setting interface. In one example, the color temperature setting interface includes a first option, a second option, and a third option. The first option is used for triggering to select the natural light color temperature correction scheme, the second option is used for triggering to select the warm light color temperature correction scheme, and the third option is used for triggering to select the cold light color temperature correction scheme. When the user expects that the light emission effect of the screen used as the flash lamp is the natural light, the first option may be clicked to trigger to select the natural light color temperature correction scheme. When the user expects that the light emission effect of the screen used as the flash lamp is the warm light, the second option may be clicked to trigger to select the warm light color temperature correction scheme. When the user expects that the light emission effect of the screen used as the flash lamp is the cold light, the third option may be clicked to trigger to select the cold light color temperature correction scheme.

In Step 203, the candidate color temperature correction scheme corresponding to the target option is determined as the first color temperature correction scheme.

After the terminal device determines the first color temperature correction scheme, the screen is controlled to emit light according to the determined first color temperature correction scheme when the screen is required to serve as the flash lamp to emit light.

In conclusion, according to the method provided by this embodiment, a plurality of alternative color temperature correction schemes are provided to the user for selection, so that different light emission effects may be presented when the screen serves as the flash lamp to emit light, thereby better meeting the user's personalized application requirements.

Figure 3:
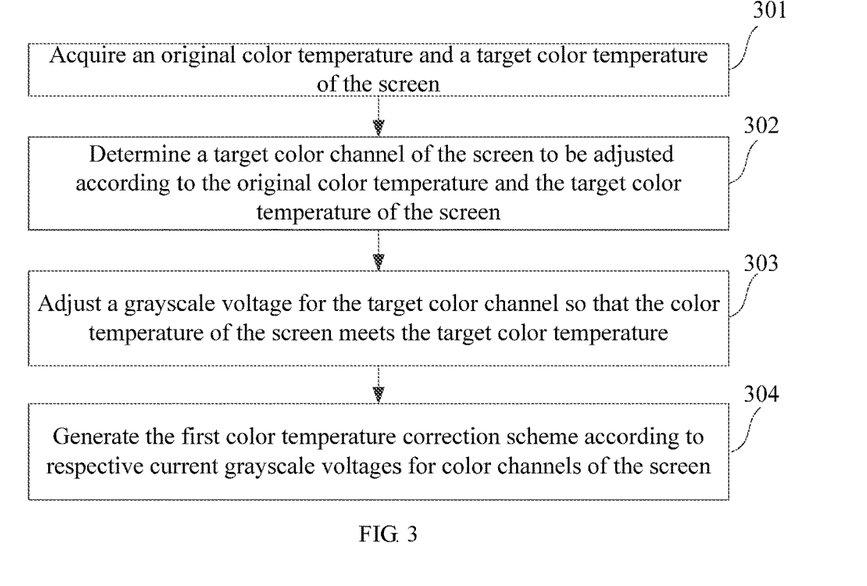
FIG. 3 is a flow chart showing a generation flow of a color temperature correction scheme according to an exemplary embodiment.

FIG. 3 is a flow chart showing a method for setting a color temperature correction scheme according to an exemplary embodiment. According to the method provided by this embodiment, a subject for implementing the steps of the method may be an electronic device capable of processing and storing other than the above terminal device, for example, a computer or a server. Alternatively, the subject for implementing the steps of the method may be the above terminal device. The method may include following steps.

In Step 301, an original color temperature and a target color temperature of the screen are acquired.

The original color temperature of the screen refers to the color temperature when the screen emits light without color shift correction. The target color temperature of the screen refers to the color temperature to which the screen is adjusted when the screen is required to serve as the flash lamp to emit light. In the embodiments of the present disclosure, methods for acquiring the original color temperature and the target color temperature of the screen are not limited. For example, when the screen is controlled to emit light without color shift correction, a current color temperature of the screen when the screen emits light is measured by means of a color temperature measuring apparatus.

In Step 302, a target color channel of the screen to be adjusted is determined according to the original color temperature and the target color temperature of the screen.

The target color temperature of the screen refers to the color temperature to which the screen is adjusted when the screen is required to serve as the flash lamp to emit light. The target color channel may be at least one of a R channel, a G channel, and a B channel.

For example, when the original color temperature of the screen is a color temperature corresponding to a warm light and the target color temperature is a color temperature corresponding to a natural light, for example, when the original color temperature of the screen is 3,500K and the target color temperature is 6,500K, the target color channel of the screen to be adjusted is determined as the R channel, for example, the grayscale for the R channel is reduced. For another example, when the original color temperature of the screen is a color temperature corresponding to a cold light and the target color temperature is the color temperature corresponding to the natural light, for example, when the original color temperature of the screen is 8,000K and the target color temperature is 6,500K, the target color channel of the screen to be adjusted is determined as the B channel, for example, the grayscale for the B channel is reduced. For still another example, when the original color temperature of the screen is the color temperature corresponding to the cold light and the target color temperature is the color temperature corresponding to the warm light, for example, when the original color temperature of the screen is 8,000K and the target color temperature is 3,500K, the target color channel of the screen to be adjusted is determined as the R channel and the B channel, for example, the grayscale for the R channel is increased and the grayscale for the B channel is reduced.

In Step 303, a grayscale voltage for the target color channel is adjusted so that the color temperature of the screen meets the target color temperature when the screen emits light.

Corresponding change may take place in the color temperature when the screen emits light by adjusting the grayscale voltage for the target color channel. The changed color temperature is acquired, and it is detected whether the changed color temperature meets the target color temperature.

In an implementation, when the target color temperature is of a numerical value, the color temperature of the screen meeting the target color temperature when the screen emits light means that the color temperature of the screen is equal to the target color temperature when the screen emits light, or a difference between the color temperature of the screen when the screen emits light and the target color temperature is smaller than a preset threshold. The preset threshold may be set according to an actual accuracy requirement. The preset threshold is set smaller when the accuracy requirement is higher.

In another implementation, when the target color temperature is within a range, the color temperature of the screen meeting the target color temperature when the screen emits light means that the color temperature of the screen falls within the range when the screen emits light.

In a specific example, supposing that the screen is controlled to emit light without color shift correction, the grayscale voltage for each color channel of the screen is 5 V, the original color temperature of the screen is 3,500K and the target color temperature is 6,500K, the target color channel of the screen to be adjusted is determined as the R channel. The color temperature when the screen emits light is increased to 6,500K by reducing the grayscale voltage for the R channel, for example, the color temperature of the screen changes to 6,500K when the grayscale voltage for the R channel is reduced from 5 V to 4.7 V.

In Step 304, the first color temperature correction scheme is generated according to respective current grayscale voltage for the color channels of the screen.

The respective current grayscale voltages for the color channels of the screen refer to the respective grayscale voltages for color channel when the color temperature meets the target color temperature when the screen emits light. For the target color channel to be adjusted, the current grayscale voltage is the adjusted grayscale voltage. For other color channels not required to be adjusted, the current grayscale voltage is the unadjusted grayscale voltage.

Corresponding to the first implementation in the embodiment as shown in FIG. 1A, the grayscales for the color channels are determined according to the current grayscale voltages for the color channels of the screen, so as to generate the first color temperature correction scheme including the respective grayscales for the color channels.

Corresponding to the second implementation in the embodiment as shown in FIG. 1A, the first color temperature correction scheme including the grayscale voltages (namely, the current grayscale voltages) for the color channels of the screen is generated according to the respective current grayscale voltages for the color channels of the screen.

In combination with the embodiment as shown in FIG. 2, in practical application, a plurality of candidate color temperature correction schemes may be generated in advance. The first color temperature correction scheme is selected from the plurality of candidate color temperature correction schemes. Each of the candidate color temperature correction schemes may be generated using the method provided by this embodiment. When generating the natural light correction scheme, the target color temperature is set as the color temperature corresponding to the natural light, for example, 6,500K. When generating the warm light correction scheme, the target color temperature is set as the color temperature corresponding to the warm light, which is smaller than 6,500K, for example, 3,500K. When generating the cold light correction scheme, the target color temperature is set as the color temperature corresponding to the cold light, which is greater than 6,500K, for example, 8,000K.

The following are apparatus embodiments of the present disclosure, which may be adopted to execute the method embodiments of the present disclosure. Reference is made to the method embodiments of the present disclosure for details not disclosed in the apparatus embodiments of the present disclosure.

Figure 4:
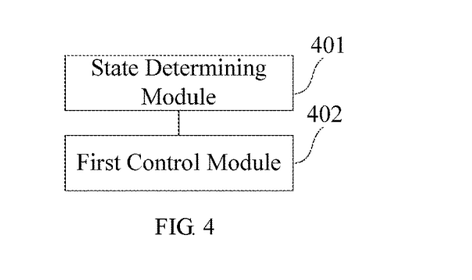
FIG. 4 is a block diagram showing an apparatus for controlling a screen to emit light according to an exemplary embodiment.

FIG. 4 is a block diagram showing an apparatus for controlling a screen of a terminal device to emit light according to an exemplary embodiment. The apparatus has functions of implementing the above method examples. The functions may be implemented either by means of hardware or by executing corresponding software by means of hardware. The apparatus may include: a state determining module 401 and a first control module 402.

The state determining module 401 is configured to determine whether a screen flash lamp function is in an active state when the terminal device is in a photographing mode, wherein the screen flash lamp function refers to a function enables the screen to serve as a flash lamp.

The first control module 402 is configured to control the screen to emit light as a flash lamp according to a first color temperature correction scheme if the screen flash lamp function is in the active state. The first color temperature correction scheme is set according to an original color temperature and a target color temperature of the screen, to adjust a color temperature of the screen from the original color temperature to the target color temperature. The original color temperature of the screen refers to a color temperature when the screen emits light without color shift correction.

In conclusion, according to the apparatus provided by this embodiment, by presetting a color temperature correction scheme in a terminal device, when the screen of the terminal device is required to serve as a flash lamp to emit light, the screen is controlled to emit light according to the color temperature correction scheme so that a color of an object finally photographed meets user expectation, thereby improving the photographing quality.

Figure 5:
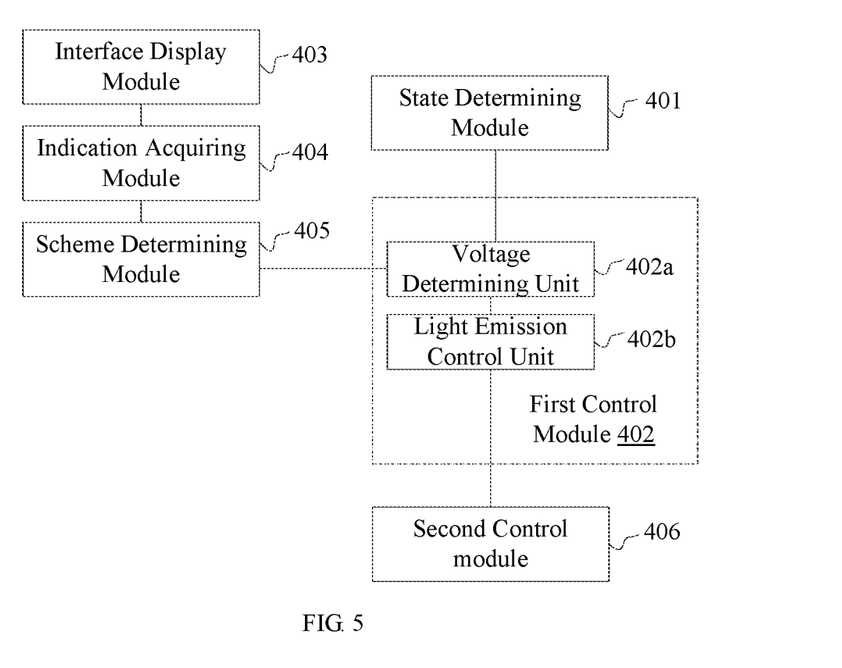
FIG. 5 is a block diagram showing an apparatus for controlling a screen to emit light according to another exemplary embodiment.

In an optional embodiment provided based on the embodiment as shown in FIG. 4, as shown in FIG. 5, the first control module 402 includes: a voltage determining submodule 402a and a light emission control submodule 402b.

The voltage determining submodule 402a is configured to determine respective grayscale voltages for color channels of the screen according to the first color temperature correction scheme.

The light emission control submodule 402b is configured to control the screen to emit light using the determined grayscale voltages when the screen is required to serve as the flash lamp to emit light.

In another optional embodiment provided based on the embodiment as shown in FIG. 4, as shown in FIG. 5, the apparatus further includes: an interface display module 403, an indication acquiring module 404 and a scheme determining module 405.

The interface display module 403 is configured to display a color temperature setting interface. The color temperature setting interface includes at least two options, and each of the options corresponds to a candidate color temperature correction scheme;

The indication acquiring module 404 is configured to acquire a selection indication for a target option.

The scheme determining module 405 is configured to determine the candidate color temperature correction scheme corresponding to the target option as the first color temperature correction scheme.

Optionally, the alternative color temperature correction scheme includes at least two of:

a natural light color temperature correction scheme, used for adjusting the color temperature of the screen so that the screen emits a natural light;

a warm light color temperature correction scheme, used for adjusting the color temperature of the screen so that the screen emits a warm light warmer than the natural light; and a cold light color temperature correction scheme, used for adjusting the color temperature of the screen so that the screen emits a cold light colder than the natural light.

In another optional embodiment provided based on the embodiment as shown in FIG. 4, as shown in FIG. 5, the apparatus further includes: a second control module 406.

The second control module 406 is configured to control the screen to emit light according to a second color temperature correction scheme after the screen flash lamp function is switched from the active state to an inactive state. The second color temperature correction scheme is used for ensuring that an interface display effect of the screen meets a preset requirement.

In another optional embodiment provided based on the embodiment as shown in FIG. 4, the apparatus further includes: a color temperature acquiring module, a channel determining module, a voltage adjusting module, and a scheme generating module.

The color temperature acquiring module is configured to acquire the original color temperature and the target color temperature of the screen.

The channel determining module is configured to determine a target color channel of the screen to be adjusted according to the original color temperature and the target color temperature of the screen.

The voltage adjusting module is configured to adjust a grayscale voltage for the target color channel so that the color temperature meets the target color temperature when the screen emits light.

The scheme generating module is configured to generate the first color temperature correction scheme according to respective current grayscale voltages for the color channels of the screen.

It should be noted that, when the apparatus provided by the above embodiments implements the functions thereof, division of the above functional modules is described as an example. In actual application, the above functions may be allocated to different functional modules for implementation according to actual needs. That is, the content structure of the device is divided into different functional modules to accomplish part or all of the functions described as above.

With regard to the apparatus in the foregoing embodiments, concrete manners for executing operations by modules thereof have been described in detail in the embodiments related to the method, and thus are not elaborated herein.

An exemplary embodiment of the present disclosure further provides an apparatus for controlling a screen of a terminal device to emit light, which can implement the method for controlling a screen of a terminal device to emit light provided by the present disclosure. The apparatus includes: a processor, and a memory configured to store executable instructions of the processor. The processor is configured to:

determine whether a screen flash lamp function is in an active state when the terminal device is in a photographing mode, wherein the screen flash lamp function enables the screen to serve as a flash lamp; and control the screen to emit light as a flash lamp according to a first color temperature correction scheme if the screen flash lamp function is in the active state, wherein the first color temperature correction scheme is configured to adjust a color temperature of the screen from an original color temperature to a target color temperature, and wherein the original color temperature is a color temperature when the screen emits light without color shift correction.

Optionally, the processor is configured to:

determine a grayscale voltage for each color channel of the screen according to the first color temperature correction scheme; and control the screen to emit light as a flash lamp using the determined grayscale voltages.

Optionally, the processor is further configured to:

display a color temperature setting interface, the color temperature setting interface comprising at least two options, and each of the options corresponding to a candidate color temperature correction scheme;

acquire a selection indication for a target option; and determine the candidate color temperature correction scheme corresponding to the target option as the first color temperature correction scheme.

Optionally, the alternative color temperature correction scheme includes at least two of:

a natural light color temperature correction scheme for adjusting the color temperature of the screen so that the screen emits a natural light;

a warm light color temperature correction scheme for adjusting the color temperature of the screen so that the screen emits a warm light which is warmer than the natural light; and a cold light color temperature correction scheme for adjusting the color temperature of the screen so that the screen emits a cold light which is colder than the natural light.

Optionally, the processor is further configured to:

control the screen to emit light according to a second color temperature correction scheme after the screen flash lamp function is switched from the active state to an inactive state, wherein the second color temperature correction scheme is configured for ensuring that an interface display effect of the screen meets a preset requirement.

Optionally, the processor is further configured to:

acquire the original color temperature and the target color temperature of the screen;

determine a target color channel of the screen to be adjusted according to the original color temperature and the target color temperature of the screen;

adjust a grayscale voltage for the target color channel so that the color temperature meets the target color temperature when the screen emits light; and generate the first color temperature correction scheme according to respective current grayscale voltages of the color channels of the screen after the adjusting.

Figure 6:
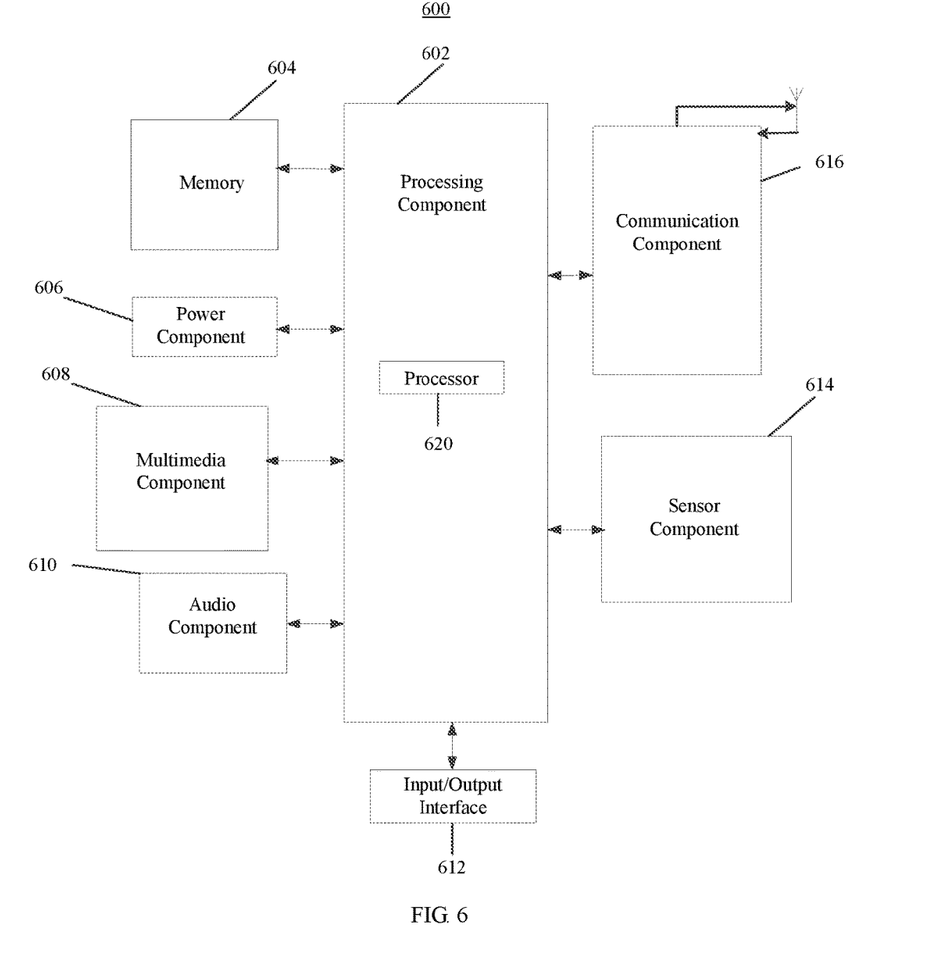
FIG. 6 is a block diagram showing an apparatus according to an exemplary embodiment.

FIG. 6 is a block diagram showing an apparatus 600 according to an exemplary embodiment. For example, the apparatus 600 may be a mobile telephone, a computer, a digital broadcasting terminal, a message transceiver device, a game console, a tablet device, a medical device, a fitness facility, a personal digital assistant, and the like.

Referring to FIG. 6, the apparatus 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the apparatus 600, such as the operations associated with display, telephone calls, data communications, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the apparatus 600. Examples of such data include instructions for any applications or methods operated on the apparatus 600, contact data, phonebook data, messages, pictures, video, etc. The memory 604 may be implemented using any type of volatile or nonvolatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the apparatus 600. The power component 606 may include a power management system, one or more power sources, and any other components associated with the generation, management, and distribution of power in the apparatus 600.

The multimedia component 608 includes a screen providing an output interface between the apparatus 600 and the user. In some embodiments, the screen may include a liquid crystal display (LCD) and a touch panel (TP). If the screen includes the touch panel, the screen may be implemented as a touch screen to receive input signals from the user. The touch panel may include one or more touch sensors to sense touches, slips, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and/or the rear camera may receive an external multimedia datum while the apparatus 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone ("MIC") configured to receive an external audio signal when the apparatus 600 is in an operation mode, such as a call mode, a recording mode, and a voice recognition mode. The received audio signal may be further stored in the memory 604 or transmitted via the communication component 616. In some examples, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the apparatus 600. For instance, the sensor component 614 may detect an open/closed status of the apparatus 600, relative positioning of components, e.g., the display and the keypad, of the apparatus 600, a change in position of the apparatus 600 or a component of the apparatus 600, a presence or absence of user contact with the apparatus 600, an orientation or an acceleration/deceleration of the apparatus 600, and a change in temperature of the apparatus 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an acceleration sensor, a gyroscope sensor, a magnetic sensor, a pressure sensor, or a temperature sensor.

The communication component 616 is configured to facilitate communication, wired or wirelessly, between the apparatus 600 and other devices. The apparatus 600 can access a wireless network based on a communication standard, such as WiFi, 2G, or 3G, or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary examples, there is also provided a non-transitory computer-readable storage medium including instructions, such as included in the memory 604, executable by the processor 620 in the apparatus 600, for performing the above-described methods. For example, the non-transitory computer-readable storage medium may be a ROM, a RAM, a CD-ROM, a magnetic tape, a floppy disc, an optical data storage device, and the like.

In a non-transitory computer-readable storage medium, when instructions in the storage medium are executed by the processor of the apparatus 600, the apparatus 600 can execute the above method.

It is to be understood that "a plurality of" as mentioned herein refers to two or more. The "and/or" used for describing an association relationship between association objects represents presence of three relationships. For example, A and/or B may represent presence of the A only, presence of both the A and the B, and presence of the B only. Character "/" generally indicates that an "or" relationship is between the association objects.

Other embodiments of the invention will be apparent to those skilled in the art from consideration of the specification and practice of the invention disclosed here. This application is intended to cover any variations, uses, or adaptations of the present invention following the general principles thereof and including such departures from the present invention as come within known or customary practice in the art. It is intended that the specification and examples be considered as exemplary only, with a true scope and spirit of the present invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for controlling a screen of a terminal device to emit light, comprising:
   determining whether a screen flash lamp function is in an active state when the terminal device is in a photographing mode, wherein the screen flash lamp function enables the screen to serve as a flash lamp; and
   controlling the screen to emit light as a flash lamp according to a first color temperature correction scheme if the screen flash lamp function is in the active state, wherein the first color temperature correction scheme is configured to adjust a color temperature of the screen from an original color temperature to a target color temperature, and wherein the original color temperature is a color temperature when the screen emits light without color shift correction,
   wherein the controlling the screen to emit light as a flash lamp according to a first color temperature correction scheme if the screen flash lamp function is in the active state comprises:
      determining a grayscale voltage for each color channel of the screen according to the first color temperature correction scheme; and
      controlling the screen to emit light as a flash lamp using the determined grayscale voltages.

2. The method according to claim 1, further comprising:
   displaying a color temperature setting interface, the color temperature setting interface comprising at least two options, and each of the options corresponding to a candidate color temperature correction scheme;
   acquiring a selection indication for a target option; and
   determining the candidate color temperature correction scheme corresponding to the target option as the first color temperature correction scheme.

3. The method according to claim 2, wherein the candidate color temperature correction schemes comprise at least two of:
   a natural light color temperature correction scheme for adjusting the color temperature of the screen so that the screen emits a natural light;
   a warm light color temperature correction scheme for adjusting the color temperature of the screen so that the screen emits a warm light which is warmer than the natural light; and
   a cold light color temperature correction scheme for adjusting the color temperature of the screen so that the screen emits a cold light which is colder than the natural light.

4. The method according to claim 1, further comprising:
   controlling the screen to emit light according to a second color temperature correction scheme after the screen flash lamp function is switched from the active state to an inactive state, wherein the second color temperature correction scheme is configured for ensuring that an interface display effect of the screen meets a preset requirement.

5. The method according to claim 1, further comprising:
   acquiring the original color temperature and the target color temperature of the screen;
   determining a target color channel of the screen to be adjusted according to the original color temperature and the target color temperature of the screen;
   adjusting a grayscale voltage for the target color channel so that the color temperature meets the target color temperature when the screen emits light; and
   generating the first color temperature correction scheme according to respective current grayscale voltages of the color channels of the screen after the adjusting.

6. An apparatus for controlling a screen of a terminal device to emit light, comprising:
   a processor, and
   a memory, configured to store executable instruction of the processor;
   wherein, the processor is configured to:
   determine whether a screen flash lamp function is in an active state when the terminal device is in a photographing mode, wherein the screen flash lamp function enables the screen to serve as a flash lamp; and
   control the screen to emit light as a flash lamp according to a first color temperature correction scheme if the screen flash lamp function is in the active state, wherein the first color temperature correction scheme is configured to adjust a color temperature of the screen from an original color temperature to a target color temperature, and wherein the original color temperature is a color temperature when the screen emits light without color shift correction, wherein the processor is further configured to:
    determine a grayscale voltage for each color channel of the screen according to the first color temperature correction scheme; and
    control the screen to emit light as a flash lamp using the determined grayscale voltages.

7. The apparatus according to claim 6, wherein the processor is further configured to:
    display a color temperature setting interface, the color temperature setting interface comprising at least two options, and each of the options corresponding to a candidate color temperature correction scheme;
    acquire a selection indication for a target option; and
    determine the candidate color temperature correction scheme corresponding to the target option as the first color temperature correction scheme.

8. The apparatus according to claim 7, wherein the candidate color temperature correction schemes comprise at least two of:
    a natural light color temperature correction scheme for adjusting the color temperature of the screen so that the screen emits a natural light;
    a warm light color temperature correction scheme for adjusting the color temperature of the screen so that the screen emits a warm light which is warmer than the natural light; and
    a cold light color temperature correction scheme for adjusting the color temperature of the screen so that the screen emits a cold light which is colder than the natural light.

9. The apparatus according to claim 6, wherein the processor is further configured to:
    control the screen to emit light according to a second color temperature correction scheme after the screen flash lamp function is switched from the active state to an inactive state, wherein the second color temperature correction scheme is configured for ensuring that an interface display effect of the screen meets a preset requirement.

10. The apparatus according to claim 6, wherein the processor is further configured to:
    acquire the original color temperature and the target color temperature of the screen;
    determine a target color channel of the screen to be adjusted according to the original color temperature and the target color temperature of the screen;
    adjust a grayscale voltage for the target color channel so that the color temperature meets the target color temperature when the screen emits light; and
    generate the first color temperature correction scheme according to respective current grayscale voltages for the color channels of the screen after the adjusting.

11. A non-transitory computer-readable storage medium having stored therein instructions that, when executed by a processor of a terminal device, causes the terminal device to perform a method for controlling a screen of the terminal device to emit light, the method comprising:
    determining whether a screen flash lamp function is in an active state when the terminal device is in a photographing mode, wherein the screen flash lamp function enables the screen to serve as a flash lamp; and
    controlling the screen to emit light as a flash lamp according to a first color temperature correction scheme if the screen flash lamp function is in the active state, wherein the first color temperature correction scheme is configured to adjust a color temperature of the screen from an original color temperature to a target color temperature, and wherein the original color temperature is a color temperature when the screen emits light without color shift correction, wherein the controlling the screen to emit light as a flash lamp according to a first color temperature correction scheme if the screen flash lamp function is in the active state comprises:
    determining a grayscale voltage for each color channel of the screen according to the first color temperature correction scheme; and
    controlling the screen to emit light as a flash lamp using the determined grayscale voltages.

* * * * *